(12) United States Patent
Hogan (10) Patent No.: US 7,236,967 B2
(45) Date of Patent: Jun. 26, 2007

(54) METHODS AND SYSTEMS FOR MAINTAINING TRANSACTION SEMANTICS IN A COMPUTER SYSTEM

(75) Inventor: Dirk J. Hogan, Columbia, MO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 586 days.

(21) Appl. No.: 10/161,369

(22) Filed: Jun. 3, 2002

(65) Prior Publication Data

US 2003/0225886 A1    Dec. 4, 2003

(51) Int. Cl.
G06F 17/30    (2006.01)
G06F 15/16    (2006.01)

(52) U.S. Cl. .............................. 707/1; 707/2; 707/202; 709/237

(58) Field of Classification Search .................... 707/1, 707/2, 103 R, 202; 709/226, 230, 237; 714/20
See application file for complete search history.

(56) References Cited

U.S. PATENT DOCUMENTS

| | | | | |
|---|---|---|---|---|
| 5,371,886 A | * | 12/1994 | Britton et al. | 707/202 |
| 5,410,685 A | * | 4/1995 | Banda et al. | 714/38 |
| 2002/0161859 A1 | * | 10/2002 | Willcox et al. | 709/219 |

* cited by examiner

Primary Examiner—Jeffrey Gaffin
Assistant Examiner—Hassan "Tony" Mahmoudi (57) ABSTRACT

An interface is used to manage nested atomic transactions, in which a transaction participant can also be a transaction manager. These transactions include fundamental and/or composite commands. Each command is represented by a command object, and the interface is implemented by methods and variables in each of these command objects. The interface enables a transaction manager to instruct its transaction participants to perform prepare and commit or rollback phases and to ascertain whether the prepare phases succeed or fail. The interface enables any command object to be a transaction manager and a transaction participant.

24 Claims, 8 Drawing Sheets

METHODS AND SYSTEMS FOR MAINTAINING TRANSACTION SEMANTICS IN A COMPUTER SYSTEM

BACKGROUND

1. Field of the Invention

The present invention relates generally to computer systems that manage transactions and, more particularly, to such computer systems that manage nested atomic transactions.

2. Related Art

Management of storage resources is an essential aspect of implementing and maintaining a storage area network (SAN). Storage management can encompass a broad range of storage functions, including file access, volume management and data backup. Of particular interest, storage management includes the ability to dynamically allocate individual storage units, such as disks, to shared storage groups and/or specific storage servers (hosts). Dynamically allocating storage units is typically achieved through change commands issued by system administrators on one or more workstations having access to resources on the SAN via a local area network (LAN). Because a single change command issued on one of these workstations can cause a SAN management system to make several interrelated changes in the SAN and in a virtual representation of the SAN, a mechanism is needed to ensure that either all the changes are made or none of the changes is made, because if only some of the changes are made, the SAN or the virtual representation of the SAN can be left in an unstable state, possibly leading to data corruption.

A set of steps that are performed completely, or not at all, is commonly called an "atomic transaction." Atomic transactions exhibit "transaction semantics," that is, if an atomic transaction begins, but one or more of its steps fails, the successful steps are reversed. Stated another way, at the end of an atomic transaction, the system is in either: (a) a desired, final state attained by a successful completion of all the steps of the transaction or (b) the state the system was in before the transaction began.

Because a SAN management system performs atomic transactions, that is, makes a set of interrelated changes to a virtual representation of a SAN or to physical devices in the actual SAN in such a way that either all the changes are completed successfully or none of the changes is made, it is desirable to provide a mechanism for aggregating a set of change commands into an atomic transaction.

Atomic transactions are typically implemented using a so-called "two-phase commit sequence." A set of preparatory steps is executed in a first ("prepare") phase. These steps perform operations to ensure that the transaction can be completed successfully in the second phase. The prepare phase does not, however, complete the transaction. For example, the prepare phase can allocate resources, ensure the existing state of the system would not prevent successful completion of the transaction and temporarily block the system from changing state in a way that might interfere with successful completion of the transaction. All transaction steps that could possibly fail are performed in the prepare phase.

If all the steps of the prepare phase succeed, the system executes the second ("commit") phase, which completes the transaction. For example, the commit phase might use the resources allocated during the prepare phase, make changes to state variables in the system, and then unblock the system from changing state. On the other hand, if any step of the prepare phase fails, the system executes a different second ("rollback") phase. For example, the rollback phase might release the allocated resources without using them, and then unblock the system from changing state.

Many of the SAN change commands issued on a workstation implicitly involve aggregating several commands. Some of these commands might be themselves aggregations of other commands. Problematically, such "nested" atomic transactions are inefficient and complicated to implement using traditional approaches. It is, therefore, desirable to provide a simple and efficient mechanism for implementing nested atomic transactions.

SUMMARY

In one aspect of the invention, an interface between a transaction manager and a first transaction participant is disclosed. This interface includes an instruction passing mechanism that enables the transaction manager to specify a first phase of a first transaction for performance by the first transaction participant. This instruction passing mechanism also enables the first transaction participant to specify a second phase of a second transaction for performance by a second transaction participant. The interface also includes a status passing mechanism that enables the first transaction participant to indicate a first completion status of the first phase of the first transaction. This status passing mechanism also enables the second transaction participant to indicate a second completion status of the second phase of the second transaction.

In another aspect of the invention, a command object for representing a command in a nested atomic transaction is disclosed. This command object implements an interface, by which the command object can receive an instruction to perform a first phase of a first transaction. Using this interface, the command object can also pass a first completion status of the first phase of the first transaction. Using this interface, the command object can also instruct a sub-command object to perform a second phase of a second transaction. Using this interface, the command object can also receive a second completion status of the second phase of the second transaction from the sub-command object.

In yet another aspect of the invention, a method is disclosed for completing a command represented by a composite command object, the composite command object managing at least one sub-command object. The method includes instructing each of the sub-command objects to perform a prepare phase; receiving a list of work units from at least one of the sub-command objects, the work units being related to the prepare phase of the at least one of the sub-command objects; passing the list of work units to a manager of the composite command object; and instructing each of the sub-command objects to perform a second phase, wherein, if all the sub-command objects' prepare phases succeed, the second phase is a commit phase, otherwise the second phase is a rollback phase.

In yet another aspect of the invention, an article of manufacture is disclosed. The article of manufacture includes a computer-readable medium storing computer-executable instructions, the instructions implementing an interface between a transaction manager and a first transaction participant. The interface includes an instruction passing mechanism that enables the transaction manager to specify a first phase of a first transaction for performance by the first transaction participant, and the first transaction participant to specify a second phase of a second transaction for performance by a second transaction participant. The interface also includes a status passing mechanism that enables the first transaction participant to indicate a first completion status of the first phase of the first transaction, and the second transaction participant to indicate a second completion status of the second phase of the second transaction.

BRIEF DESCRIPTION OF THE DRAWINGS

The present invention can be better understood by referring to the following detailed description of a preferred embodiment in conjunction with the accompanying drawings, in which.

DETAILED DESCRIPTION

The present invention provides an interface that can be used to manage nested atomic transactions. The invention is particularly useful in managing resources in a storage area network (SAN), however it can be used in other distributed or monolithic systems that must manage nested atomic transactions. The transactions include fundamental and/or composite commands. Each command is represented by a command object, according to, for example, the object-oriented programming paradigm, and the interface is implemented by each of these command objects.

A fundamental command is one that can be executed without invoking additional commands, whereas a composite command invokes additional fundamental or composite commands to complete. An object that invokes one or more commands is referred to as a "transaction manager" of the invoked command object(s), and the invoked command object(s) is referred to as a "transaction participant" of the transaction managed by the transaction manager.

The interface of the present invention enables transaction managers to communicate with their transaction participants. In particular, the interface enables a transaction manager to instruct its transaction participants to perform prepare and commit or rollback phases. In addition, the interface enables the transaction manager to ascertain whether the prepare phases of its respective transaction participants succeeded or failed. This interface enables any command object to be a transaction manager and a transaction participant.

Enabling a command object to be both a transaction manager and a transaction participant facilitates nested transactions. For example, if a transaction participant is a composite command, it manages its sub-commands. Since the same interface is used between each transaction manager-transaction participant pair, the present invention provides a simple and efficient mechanism for implementing nested atomic transactions.

Figure 1:
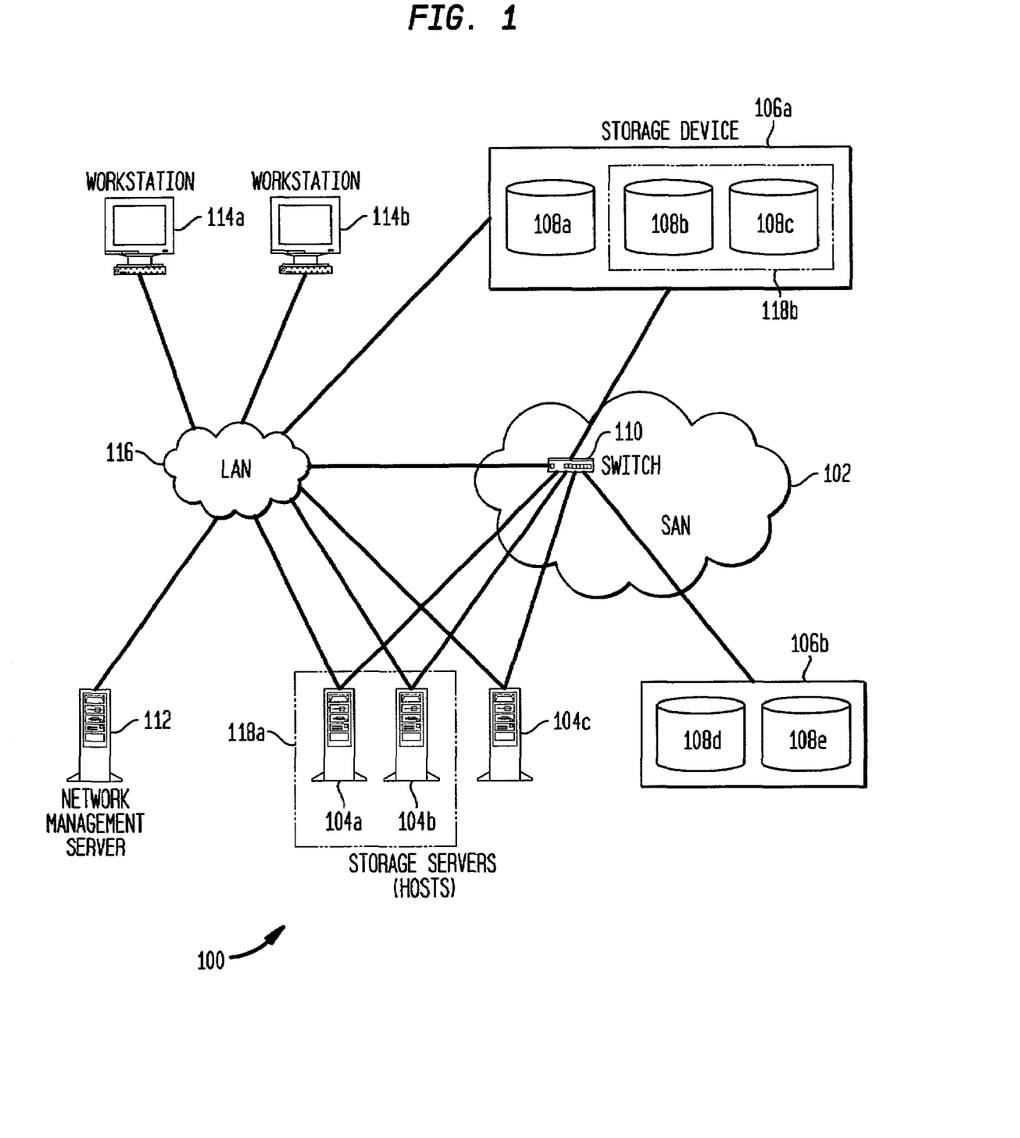
FIG. 1 is a block diagram of an exemplary storage area network environment, in which the present invention can be used to manage nested atomic transactions.

FIG. 1 illustrates a network environment 100 that includes a SAN 102. The SAN 102 includes one or more storage servers 104a-104c (collectively and generally, servers 104 as well as one or more storage devices 106a, 106b. Each storage device 106 further includes a plurality of storage units 108a-108e. Servers (also referred to has hosts) 104 provide access to the storage units 108 included in the storage devices 106, as is well known in the art. It is readily understood that the SAN 102 may employ various network topologies and technologies. For example, a typical Fiber Channel SAN uses switches (such as switch 110), hubs, routers, etc. to interconnect the hosts 104 and the storage devices 106. Appropriate SAN infrastructure components, hosts, storage devices and storage units are readily available from Hewlett-Packard, Palo Alto, Calif., EMC Corporation, Hopkington, Mass. and other suppliers. While the following description is provided with reference to a SAN, it should be readily understood that the present invention is applicable to other types of distributed or monolithic systems that manage nested atomic transactions.

Management of storage resources is administered by a network management server 112. Change commands are typically used to express one or more requests to change the configuration of the SAN 102, as is well known in the art. For example, a change command can instruct the switch 110 to establish a data path between one of the hosts 104 and one of the storage devices 106. Change commands may be issued from one or more workstations 114 residing in the network environment 100. The change commands are transmitted over a local area network (LAN) 116 to the network management server 112. The changes to the SAN configuration are then implemented by the network management server 112 by sending instructions over the LAN 116 to the hosts 104, the storage devices 106 and other resources (such as the switch 110) in the SAN 102, collectively herein referred to as "SAN resources." In some cases, such as storage device 106b, the instructions (or security information, as described below) are sent via small computer system interconnect (SCSI) commands and are delivered via the SAN 102, rather than via the LAN 116.

The change commands issued on the workstations 114 can also impact other entities (not shown for simplicity), such as computers on which applications execute and connections between these computers and the hosts 104. To the extent that these other entities are impacted by these change commands, these other entities are included in the definition of SAN resources, and they are managed by the network management server 112, as described herein.

All SAN resources are represented in a virtual representation ("repository") of the SAN's configuration, which contains a detailed model of the physical state of the SAN resources, as is well known in the art. The repository thus expresses the current configuration state of the SAN.

Storage allocation commands can be used to dynamically configure storage resources within the SAN 102. These commands modify the repository before and/or after corresponding changes are made to the SAN resources. Storage allocation is generally implemented using two fundamental change commands: assign and unassign. When an individual storage unit 108 is assigned to a host 104, the host is granted read-write access to the assigned storage unit. This access need not be exclusive; that is, a storage unit 108 can be simultaneously assigned to several hosts 104, such as when the hosts are members of a share group (described below). Conversely, when a storage unit 108 is unassigned from a host 104, the storage unit is no longer available to the host. Although an entire storage unit 108 can be assigned to a host 104, sometimes only a portion of the storage unit is assigned to the host. In either case, the term "logical unit" is commonly used to refer to the portion (or whole) of the storage unit 108 that is assigned to the host 104. For simplicity, we will use the terms storage unit and logical unit synonymously.

Storage allocation is also facilitated through the use of security groups. Security groups enable the grouping of, and access to, related storage units 108. For illustration purposes, two types of security groups are described below. It is, however, envisioned that other types of groups are also within the broader aspects of the present invention.

First, a "share group" is a group of hosts 104 and a group of storage units 108. For example, hosts 104a and 104b and storage units 108b and 108c can comprise a share group 118. A share group allows multiple hosts, for example hosts 104a and 104b, to share a common set of storage units, for example storage units 108b and 108c. All the hosts 104a and 104b in the share group 118 have read-write access to all the storage units 108b and 108c in the share group. If a host, for example host 104c, is assigned to the share group 118, all of the storage in the share group is also assigned to the host. If a host, for example host 104a, is unassigned from the share group 118, all of the storage in the share group is unassigned from the host, making the storage no longer accessible to the host. Similarly, if a storage unit, such as the storage unit 108a, is assigned to the share group 118, the storage unit is automatically assigned to each host 104a and 104b in the share group. When a storage unit is unassigned from a share group, it is automatically unassigned from each host in the share group.

Second, an "associated LUN (logical unit) group" is a group of storage units 108. All the storage units 108 in an associated LUN group can be assigned and unassigned as a group. For instance, associated LUN groups may be used to group stripe sets, mirror sets, and sets of storage units that contain parts of a database. When an associated LUN group is assigned to a host 104 or share group 118, all of the storage units 108 in the associated LUN group are assigned to the particular host or all of the hosts in the share group. When an associated LUN group is unassigned from a host 104 or share group, all of the logical units in the associated LUN group are unassigned from the affected hosts. Similarly, if a storage unit 108 is added to an associated LUN group that is already assigned to a host 104 or share group, then the newly assigned storage unit is automatically assigned to the particular host or all of the hosts in the share group. If the storage unit 108 is unassigned from an associated LUN group, then the unassigned storage unit is automatically unassigned from the affected hosts.

Assigning a logical unit, such as storage unit 108a, to a host, such as host 104a, involves establishing a data path between the host and the storage unit. Establishing this data path includes allocating a first port in the switch 110 to connect the host 104a to the switch and a second port in the switch to connect the switch to the storage device 106a. However, some switches, hubs, etc. in the SAN 102 restrict I/O traffic, that is, they allow traffic only between certain hosts 104 and certain storage devices 106, and they do not pass traffic between other hosts and other storage devices. Some hosts 104 also provide security services, i.e. they are configured with security information before they can be used. Therefore, establishing this data path might also include other steps, such as providing security information to the host 104a and to the switch 110.

From the above description, it can be seen that assigning a logical unit to a host involves several steps. If any of the steps fail, the assignment of the logical unit to the host fails as a whole, and any SAN resources that were successfully allocated are deallocated. For example, if the first port in the switch 110 was successfully allocated, but the second port in the switch could not be allocated, the first port is deallocated, otherwise the first port in the switch would become permanently unavailable for other uses. Assigning a host to a logical unit is, therefore, an atomic transaction. Furthermore, many commands issued on the workstations 114 are "composite" commands or "command sets," which implicitly or explicitly include several commands, such as several assign logical unit to host commands. These composite commands and command sets are performed atomically.

Figure 2:
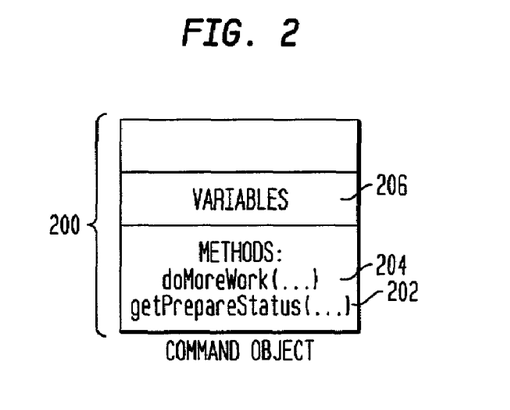
FIG. 2 is a modified Unified Modeling Language ("UML") diagram of a command object used to manage the nested atomic transactions of FIG. 1.

Employing an object-oriented programming paradigm, each command, such as AssignHostToAssociatedLunGroup, is represented by a command object, as illustrated in FIG. 2. In typical object-oriented programming fashion, each command object includes methods for performing its primary functions and variables to keep track of its status and the status of its methods. Some of these methods (and optionally variables) are used to create an interface to the command objects, as described below.

Some command objects ("fundamental command objects") perform all operations related to their primary function. Other command objects ("composite command objects") do not perform all the operations related to their primary function, so they create additional command objects to perform subfunctions. For example, the AssignHostToAssociatedLunGroup command is a composite command. Several AssignLunToHost commands are executed to complete an AssignHostToAssociatedLunGroup command. We refer to the created command objects as "sub-command objects", although they are command objects, just like their creators. These additional sub-command objects can be fundamental, composite or a combination of both. Thus, command objects can create and manage other command objects to represent nested transactions.

Figure 3:
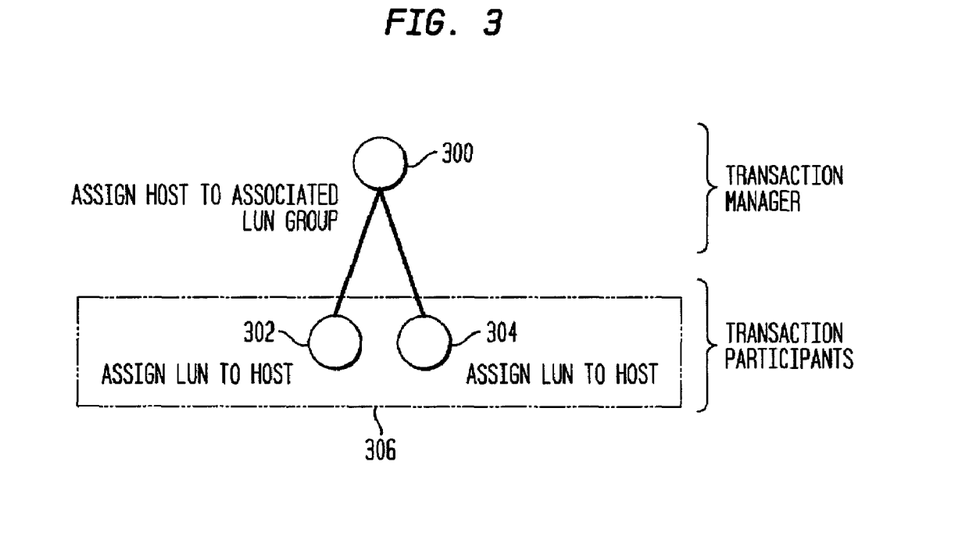
FIG. 3 is a diagram of a portion of an exemplary nested atomic transaction, such as one that might be managed by the system of FIG. 1.

FIG. 3 illustrates relationships among a composite command object 300 and its two sub-command objects 302 and 304. In this example, the composite command object 300 represents an AssignHostToAssociatedLunGroup command, and each of the sub-command objects 302 and 304 represents an AssignLunToHost command, which is carried out to complete the composite command. The AssignHostToAssociatedLunGroup command object 300 is a "transaction manager" of its immediate sub-command objects 302 and 304. The two sub-command objects 302 and 304 are "transaction participants" in an atomic transaction 306 managed by their creator, the AssignHostToAssociatedLunGroup command object 300. As previously discussed, either all the sub-command objects 302 and 304 of the atomic transaction 306 complete successfully, or none of them completes.

Figure 4:
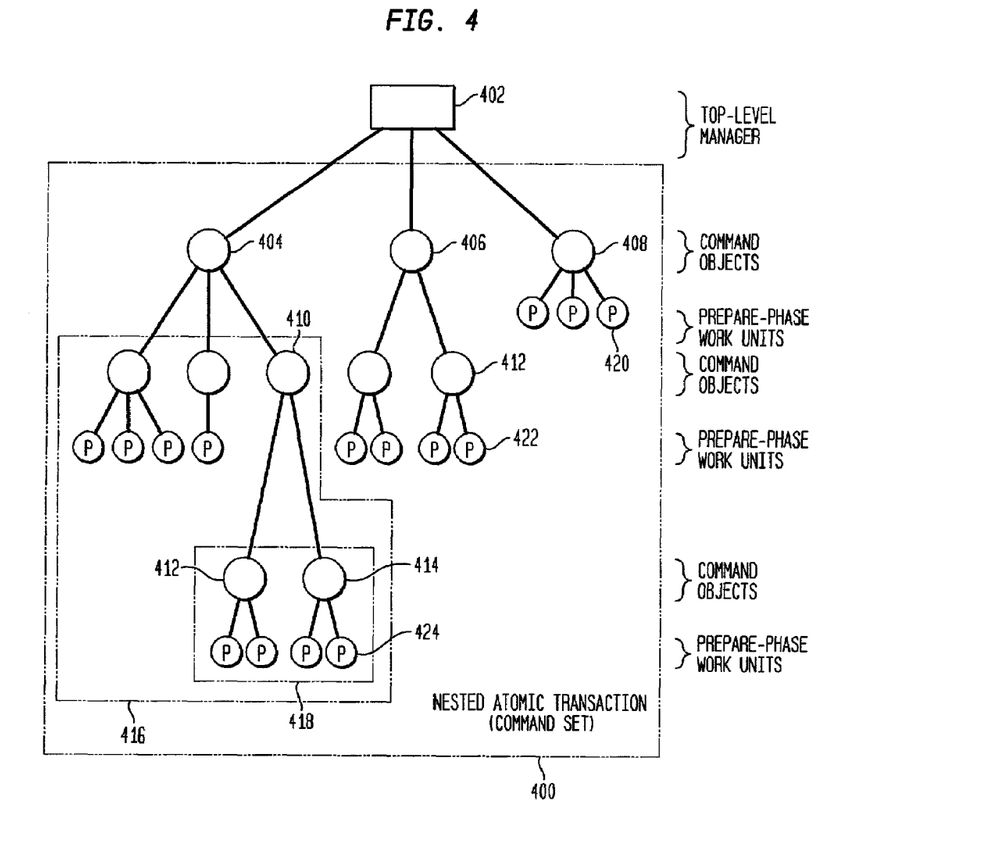
FIG. 4 is a diagram of an exemplary nested atomic transaction, such as one that might be managed by the system of FIG. 1.

According to the present invention, any command object can be a participant in a higher-level transaction, as well as being a transaction manager of sub-command objects in a lower-level transaction. FIG. 4 illustrates an example of a nested atomic transaction 400 having several levels. Assume a system administrator instructs the network management server 112 (FIG. 1) to perform three change commands and to perform these three commands as a single atomic transaction. We call this a "command set." A top-level manager 402 (FIG. 4) in the network management server 112 creates command objects 404, 406 and 408 to represent the three commands of the command set. In this example, command object 408 is a fundamental command object, while command objects 404 and 406 are composite command objects. The composite command objects 404 and 406 create and manage sub-command objects, such as command objects 410 and 412. Command object 410 is a participant in a transaction managed by command object 404, as previously discussed. Command object 410 is also a transaction manager of two sub-command objects 412 and 414.

As mentioned above, dashed box 400 represents a nested atomic transaction having several levels. This transaction 400 is nested, because it includes several lower-level transactions. For example, lower-level transaction 416 is carried out to complete the command represented by command object 404, and lower-level transaction 418 is carried out to complete the command represented by command object 410.

Figure 5:
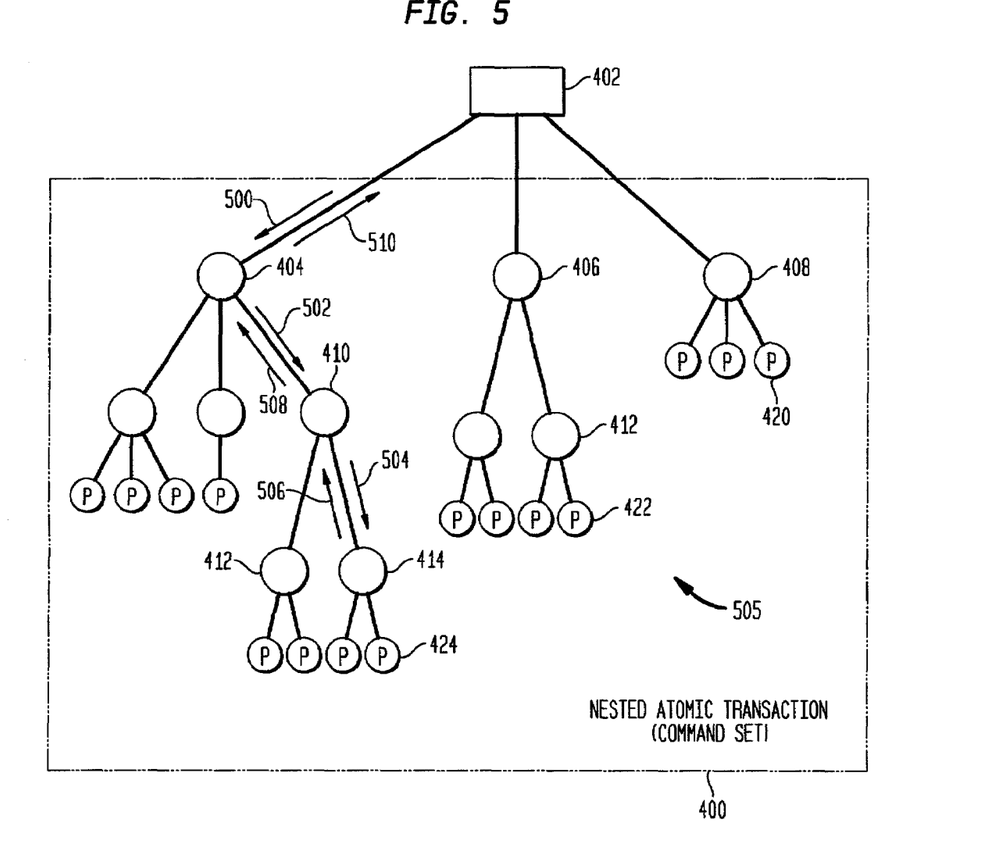
FIG. 5 is a diagram showing communication of instructions and status information among command objects in the nested atomic transaction of FIG. 4.

The command objects utilize a two-phase commit sequence. A transaction manager (such as command object 404 and top-level manager 402) instructs its sub-command objects when to perform their respective prepare and commit or rollback phases, and these sub-command objects report their success/failure statuses back to their transaction manager. FIG. 5 illustrates examples of communication of these instructions and status reports. Arrow 500 represents instructions from the top-level manager 402 to command object 404. Similarly, arrows 502 and 504 represent instructions from command objects 404 and 410 to their respective sub-command objects 410 and 414. Arrow 506 represents status information being sent from sub-command object 414 to its transaction manager (command object 410). Similarly, arrows 508 and 510 represent status information being sent from various command objects to their respective transaction managers. For simplicity, not all instruction and status arrows are shown in FIG. 5.

After a command object has instructed its sub-command objects to perform their respective prepare phases, if all the prepare phases complete successfully, the transaction manager instructs the sub-command objects to perform their respective commit phases. On the other hand, if any of the prepare phases fail, the transaction manager instructs the sub-command objects to perform their respective rollback phases. In other words, the transaction manager is responsible for instructing its sub-command objects to perform specified phases, gathering completion status information from its sub-command objects relative to the specified phases and communicating this status information back down to its sub-command objects. As a result, each sub-command object is made aware of the success/failure status of its "sibling" command objects, i.e. the other command objects created by the transaction manager.

How a command object ascertains whether its own prepare phase completed successfully depends on whether the command object is fundamental or composite. A fundamental command object, such as command object 414 (FIG. 4), performs one or more operations to complete its prepare phase. Examples of these operations are illustrated in FIG. 4 as prepare-phase "work units" 420, 422 and 424. If all the work units of a command object succeed, the command object reports success to its transaction manager.

Composite command objects, such as command objects 404 and 406, can also perform prepare-phase work units, but more typically composite command objects just create and manage sub-command objects. A composite command object reports success to its transaction manager if all its sub-command objects (and its own work units, if any) were successful. The composite command object cannot, therefore, report to its transaction manager until all of its sub-command objects have reported to it. Returning to FIG. 5, it can be seen that instructions, such as those illustrated by arrows 500, 502 and 504, propagate down a tree 505 rooted at the top-level manager 402, and status information, such as that illustrated by arrows 506, 508 and 510, propagates up the tree 505.

According to the present invention, two traversals are made of the tree 505: the first traversal represents the prepare phase, and the second traversal represents either the commit or the rollback phase. Although not illustrated in FIGS. 4 and 5, during the second traversal of the tree 505, the prepare-phase work units, such as work units 420, 422 and 424, are replaced by commit-phase work units or rollback-phase work units.

We will now described the operation of the top-level manager 402 in more detail, as well as the methods and variables used by the command objects to implement the interface, by which transaction managers control and communicate with their respective transaction participants.

This interface includes a "getPrepareStatus( )" method 202 (FIG. 2) and a "doMoreWork( )" method 204. The prototype for the first method is "int getPrepareStatus( )". The getPrepareStatus( ) method returns status information from its command object to its transaction manager to indicate whether the command object's prepare phase succeed, as represented by arrow 508 in FIG. 5.

The prototype for the second method is "void doMoreWork(Collection collect, boolean forward)". The parameter "collect" is described in more detail below. The Boolean parameter "forward" indicates a direction, that is, forward toward completion or backward toward rollback, in which the transaction is to proceed. This parameter instructs a sub-command object to perform its commit or rollback phase. Arrow 502 in FIG. 5 is an example of such an instruction. As will be explained in more detail below, the doMoreWork( ) method is invoked twice for each command object. The first invocation corresponds to the prepare phase, and the second invocation corresponds to either the commit or the rollback phase. These two invocations correspond to the two traversals of the tree 505.

Figure 6:
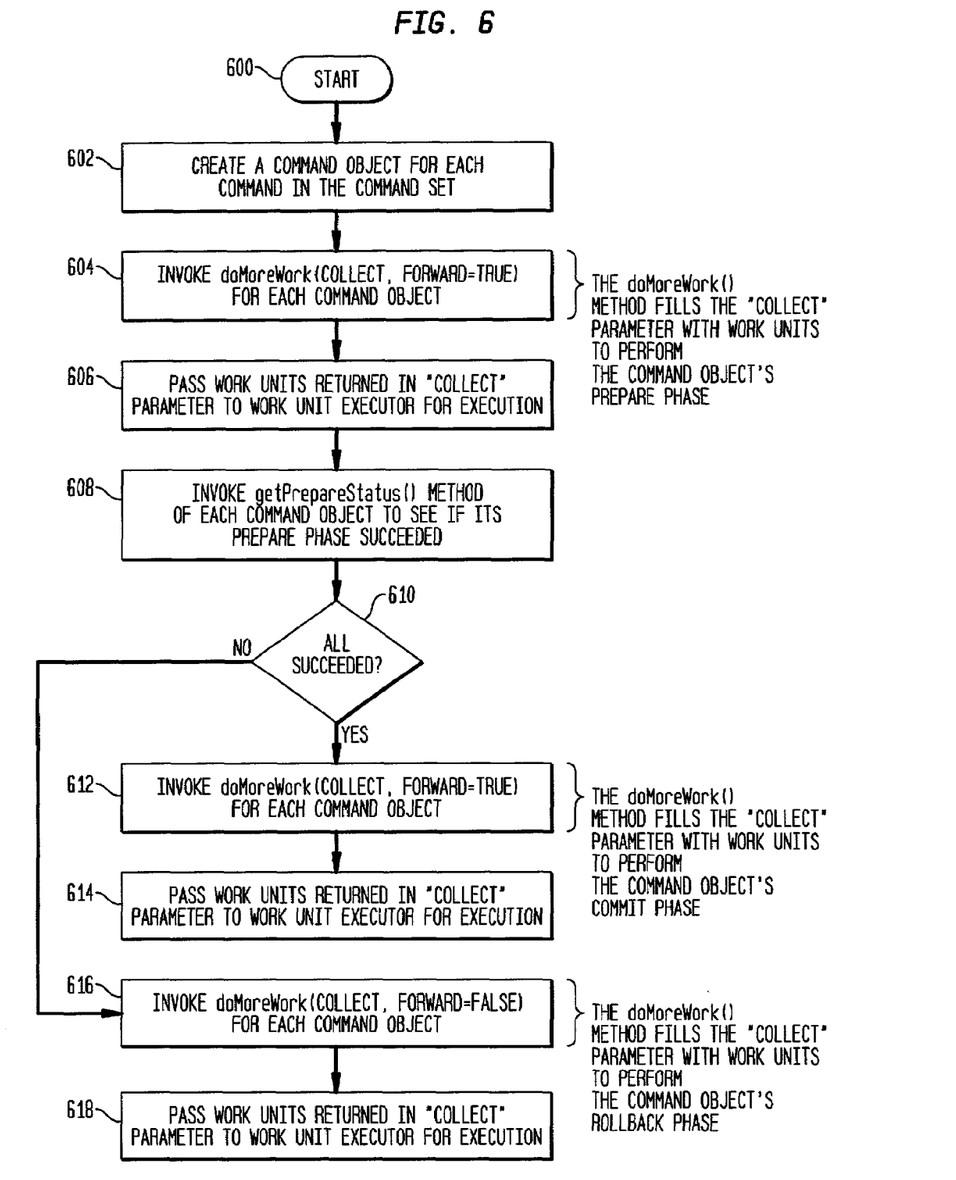
FIG. 6 is a flowchart illustrating operation of a top-level manager in the diagram of FIGS. 4 and 5.

FIG. 6 is a flowchart illustrating operation of the top-level manager 402. The top-level manager begins at 600, and at 602 it creates a command object for each command in a command set. (A command set can, of course, comprise only one fundamental or composite command, but we will continue as in the example illustrated in FIGS. 4 and 5.) At 604, the top-level manager 402 invokes the doMoreWork( ) method for each command object to instruct the command object to perform its prepare phase. On the first invocation of the doMoreWork( ), the value "TRUE" is passed in the "forward" parameter, although the value passed is not critical, because the first invocation of the doMoreWork( ) method corresponds to the prepare phase. As will be explained in more detail below, the doMoreWork( ) methods can fill the "collect" parameter with work units that are to be performed to complete the command objects' prepare phases. The "collect" parameter is returned to the top-level manager 402. At 606, the top-level manager 402 passes the collection of work units to a work unit executor (not shown)

in the network management server 112 for execution. At 608, the top-level manager 402 invokes the getPrepareStatus( ) method for each command object to ascertain if the command object's prepare phase succeeded. At 610, if all the command objects' prepare phases succeeded, control passes to 612, otherwise (i.e. if any command object's prepare phase failed), control passes to 616.

Assuming all the prepare phases succeeded, at 612 the top-level manager 402 invokes the doMoreWork( ) method a second time for each command object passing TRUE in the "forward" parameter to instruct the command object to perform its commit phase. On the second invocation, the doMoreWork( ) methods can fill the "collect" parameter with work units that are to be performed to complete the command objects' commit phases. At 614, the top-level manager 402 passes the collection of work units to the work unit executor in the network management server 112 for execution.

On the other hand, if any prepare phase failed, at 616 the top-level manager 402 invokes the doMoreWork( ) method a second time for each command object, this time passing FALSE in the "forward" parameter to instruct the command object to perform its rollback phase. The doMoreWork( ) methods can fill the "collect" parameter with work units that are to be performed to complete the command objects' rollback phases. At 618, the top-level manager 402 passes the collection of work units to the work unit executor in the network management server 112 for execution.

Figure 7:
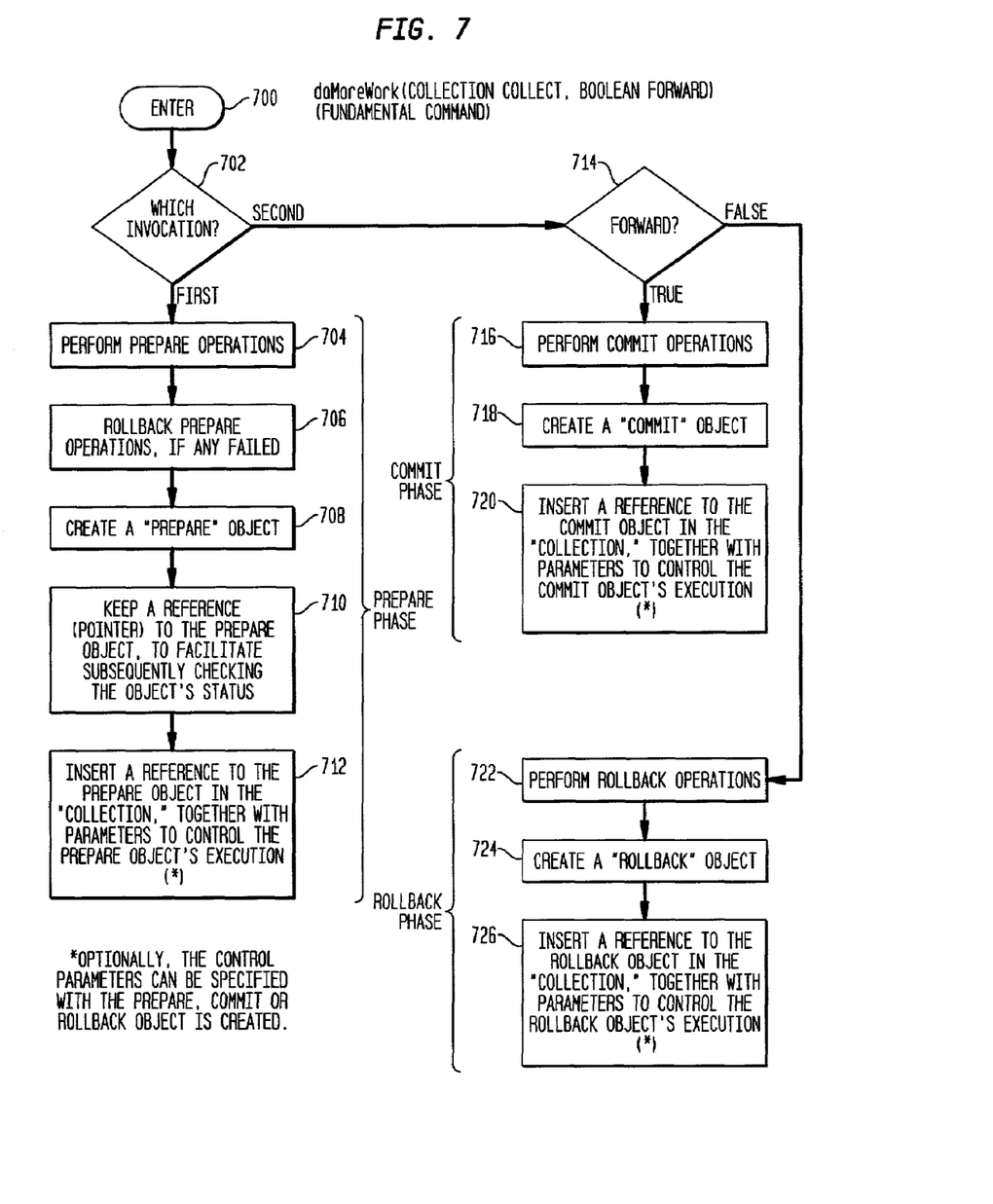
FIG. 7 is a flowchart of a doMoreWork( ) method for a fundamental command object invoked by the top-level manager of FIG. 6 or the doMoreWork( ) method of FIG. 10.

FIG. 7 is a flowchart of the doMoreWork( ) method for a fundamental command object. The flowchart illustrates several alternative approaches. In one approach ("in-line processing"), all the operations to perform a prepare, commit or rollback phase are included in the doMoreWork( ) method. In a second approach ("batch processing"), the doMoreWork( ) method adds work units to the "collect" parameter, and these work units are executed by the work unit executor after the doMoreWork( ) method completes. In a third approach, a combination of in-line and batch processing is used. The flowchart in FIG. 7 illustrates the in-line and batch processing approaches being used together, however either approach alone, or a combination of approaches, can be used.

Upon entry at 700, the method branches at 702 depending on whether this is the first or second invocation. On the first invocation, which represents the prepare phase, the method proceeds to 704, where it can optionally perform operations to complete, or partially complete, the prepare phase. At 706, the method can optionally rollback the prepare operations, if any of them failed. By rolling back these operations at 706, the method either obviates the need for a separate rollback phase or simplifies the operation of the rollback phase. Operations 704 and 706 correspond to the in-line processing approach described above.

At 708, the method optionally creates a prepare object, which will be used by the work unit executor to execute work items to complete the prepare phase. At 710, the method keeps a reference to the prepare object, so the command object can later check the status of the prepare object. This reference can be kept in the variables portion 206 (FIG. 2) of the command object 200. At 712, the method inserts a reference to the prepare object into the "collect" parameter, together with additional parameters to control the prepare object's execution. For example, if the command object represents a the AssignLUToHost command, the control parameters added to "collect" can identify: the logical unit 108 being assigned, the host 104 to which the logical unit is being assigned, the switch 110 that will interconnect the host and the storage device 106, the ports on the switch that will be used to implement the connection between the host and the storage device, security information for the switch and the host, etc.

The "collect" parameter is returned to the transaction manager of this command object. Alternatively, the control parameters can be specified when the prepare object is created, instead of passing them through the "collect" parameter. Operations 708, 710 and 712 corresponds to the batch processing approach described above.

The second invocation of the doMoreWork( ) method corresponds to either the commit or the rollback phase, as indicated by the Boolean parameter "forward." On the second invocation of the doMoreWork( ) method, control passes to 714, which branches depending on the value of the Boolean "forward" parameter. If the "forward" parameter is TRUE, indicating the method should perform the commit phase, control passes to 716, otherwise control passes to 722.

At 716, the method optionally performs operations to complete, or partially complete, the commit phase. At 718, the method optionally creates a commit object, which will be used by the work unit executor to execute work items to complete the commit phase. At 720, the method inserts a reference to the commit object into the "collect" parameter, together with additional parameters to control the commit object's execution. The "collect" parameter is returned to the transaction manager of this command object. Alternatively, the control parameters can be specified when the commit object is created.

On the second invocation of the doMoreWork( ) method, if the "forward" parameter is FALSE, control passes to 722 to begin the rollback phase. At 722, the method optionally performs operations to complete, or partially complete, the rollback phase. At 724, the method optionally creates a rollback object, which will be used by the work unit executor to execute work items to complete the rollback phase. At 726, the method inserts a reference to the rollback object into the "collect" parameter, together with additional parameters to control the rollback object's execution. The "collect" parameter is returned to the transaction manager of this command object. Alternatively, the control parameters can be specified when the rollback object is created.

Figure 8:
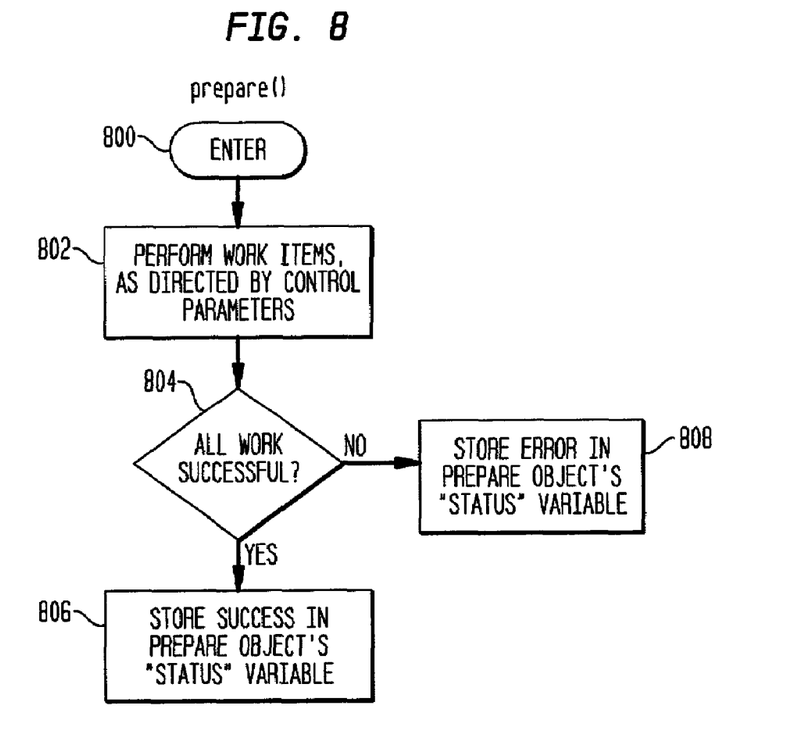
FIG. 8 is a flowchart of a prepare object created by the doMoreWork( ) method of FIG. 7.

FIG. 8 is a flowchart of the prepare object created by the doMoreWork( ) method at 708 (FIG. 7). The prepare object can be used by the work unit executor in the network management server 112 to execute the work units placed in the "collect" parameter by the doMoreWork() methods. Alternatively, the prepare object can execute autonomously, without an work unit executor. The operations shown in this flowchart can be executed in the prepare object's constructor or in another appropriate method. After entry at 800, at 802, the prepare object performs work items, as directed by the control parameters placed in the "collect" parameter by the doMoreWork( ) method or passed to the prepare object when the prepare object was created. If the prepare object is used by the work unit executor in the network management server 112, the work unit executor passes the control parameters to the prepare object. At 804, the method branches to either 806 or 808, depending on whether the work units were successfully executed. At 806, the method stores SUCCESS in the prepare object's status variable, whereas at 808, the methods stores ERROR in the status variable. Optionally, if the prepare phase fails, at 808 the method can rollback the prepare-phase work units and store $ERROR_{13}PLUS_{13}SUCCESSFUL_{13}ROLLBACK$ in the status variable.

Figure 9:
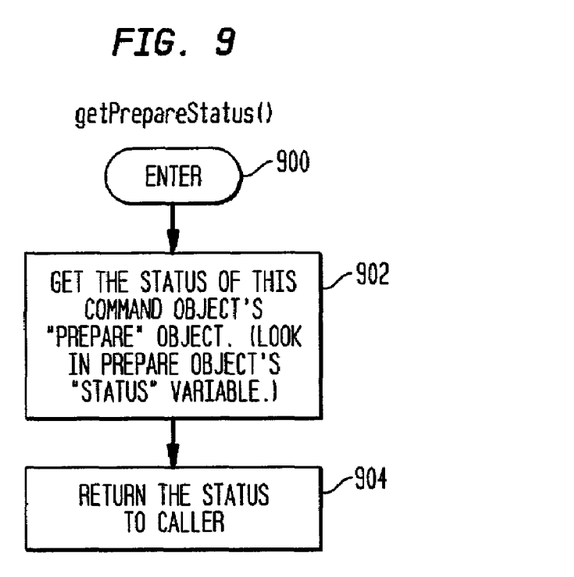
FIG. 9 is a flowchart of a getPrepareStatus( ) method invoked by the top-level manager of FIG. 6 or the doMoreWork( ) method of FIG. 10.

FIG. 9 is a flowchart of the getPrepareStatus( ) method invoked by the top-level manager 402 at 608 (FIG. 6). (As will be seen below, the getPrepareStatus( ) method is also invoked by the doMoreWork( ) method of a composite command.) After entry at 900, at 902 the method ascertains the status of the prepare phase by consulting the prepare object's status variable. At 904, the method returns this status to its caller.

Figure 10:
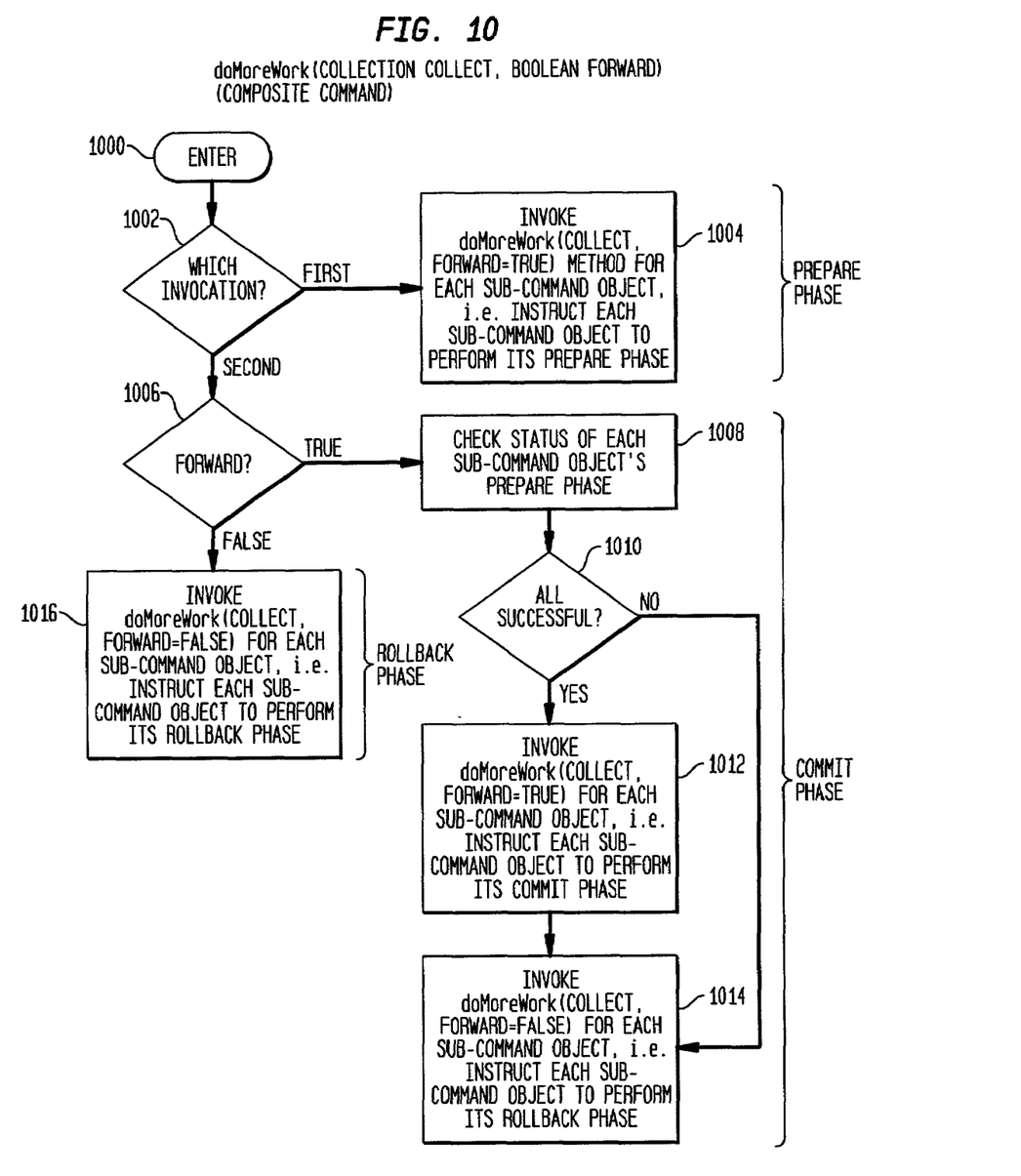
FIG. 10 is a flowchart of a doMoreWork( ) method for a composite command object.

FIG. 10 is a flowchart of the doMoreWork( ) method for a composite command object. Upon entry at 1000, the method branches at 1002, depending on whether this is the first or second invocation. On the first invocation, which represents the prepare phase, the method proceeds to 1004, where it invokes the doMoreWork( ) method for each sub-command object, thereby instructing the sub-command objects to perform their respective prepare phases. The method passes the "collect" parameter to the doMoreWork( ) methods of the sub-command objects. The doMoreWork( ) methods of fundamental sub-command objects add work units to ("augment") the "collect" parameter, as described above with reference to FIG. 7. This method then returns the augmented "collect" parameter to its transaction manager. At 1004, the method passes TRUE in the "forward" parameter, although the value passed is not critical, because the first invocation of doMoreWork( ) method corresponds to the prepare phase.

If this is the second invocation of the doMoreWork( ) method, corresponding to either the commit or the rollback phase, at 1002, control is passed to 1006. At 1006, if the "forward" parameter is TRUE, corresponding to the commit phase, control is passed to 1008. At 1008, the method checks the status of each of this command object's sub-command objects, and more particularly, the status of the sub-command objects' prepare phases. This check is made by invoking the getPrepareStatus( ) method (FIG. 9) for each of the sub-command objects. At 1010, if all the sub-command objects' prepare phases succeeded, control passes to 1012, where this method invokes the doMoreWork( ) method for each sub-command object, passing TRUE in the "forward" parameter, thereby instructing the sub-command object to perform its prepare phase. On the other hand, if any sub-command object's prepare phase failed, at 1010 control is passed to 1014, where this method invokes the doMore-Work( ) method for each sub-command object, passing FALSE in the "forward" parameter, thereby instructing the sub-command object to perform its rollback phase. In either case, this method passes the "collect" parameter to the doMoreWork( ) methods of the sub-command objects and returns the augmented "collect" parameter to its transaction manager.

At 1006, if the "forward" parameter is FALSE, the transaction manager of this command object has instructed this command object to perform its rollback phase. At 1016, this method invokes the doMoreWork( ) method for each of its sub-command objects, passing FALSE in the "forward" parameter, thereby instructing the sub-command object to perform its rollback phase.

The invention, therefore, provides an instruction passing mechanism for passing instructions from a top-level manager to a command object and from a command object to a sub-command object. This interface can be implemented in a number of ways, such as with the doMoreWork( ) method. The "forward" parameter can be used to instruct the command object to perform a specific phase (prepare, commit or rollback), although as previously indicated, the "forward" parameter is not necessary to instruct the command object to perform the prepare phase, since the first invocation of the doMoreWork( ) method corresponds to the prepare phase. Consequently, the doMoreWork( ) method can count the number of times it is invoked as part of its determination of which phase to perform. Alternatively, the phase could be encoded and passed to the doMoreWork( ) method via a parameter, for example 1=prepare, 2=commit and 3=rollback. Alternatively, the three phases could be implemented as separate methods and/or separate threads. Alternatively, other programming techniques can be used for passing control to a specific routine corresponding to a specific phase or passing a parameter to a routine to control its operation.

The invention also provides a status passing mechanism for passing a completion status of a phase from a sub-command object to its transaction manager or from a command object to the top level manager 402. This status passing mechanism can be implemented with the doMore-Work( ) method and the getPrepareStatus( ) method, such as by returning a value. Alternatively, object variables or other programming techniques can be used to inform one routine of the status of another routine.

The invention also provides a parameter passing mechanism for passing a list of work units related to a phase of a transaction. The "collect" parameter of the doMoreWork( ) method is one implementation of this parameter passing mechanism. Alternatively, global variables or other programming techniques for passing data from one routine to another routine can be used.

A "Collection" is a well-known Java programming term meaning a group of objects, but it can be implement in other programming languages with a linked list, array, tree or any other construct that allows elements to be added to it.

The doMoreWork( ) method 204, the getPrepareStatus( ) method 202, the command object 200 and the top-level manager 402 (collectively "software items") are preferably implemented in software that can be stored in the memory, and control the operation, of a computer. Furthermore, the software items can be stored on a removable or fixed computer-readable medium, such as a CD-ROM, DVD, hard disk or floppy disk. In addition, these software items can be transmitted over a wireless or wired communication line or network.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. A system, comprising a command object representing a command in a nested atomic transaction, the command object comprising:

an interface constructed and arranged to to pass to the command object an instruction to perform a first phase of a first of the managed nested atomic transactions; to pass a first completion status of the first phase of the first transaction; to pass an instruction to a a sub-command object to perform a second phase of a second one of the managed nested atomic transactions; and to pass a second completion status of the second phase of the second transaction from the sub-command object.

2. The system of claim 1, wherein each of the first phase and the second phase is selected from a list comprising prepare, commit and rollback.

3. The system of claim 1, wherein the interface-comprises:

a routine configured to count how many times the routine has been invoked and the instruction to perform the first phase of the first transaction includes the count of the number of times the routine has been invoked.

4. The system of claim 1, wherein the interface is further configured to pass an instruction from the command object to insert additional work units related to the first phase of the transaction into the list of work units, and to pass the list of work units.

5. The system of claim 1, wherein the interface comprises a status reporting routine.

6. The system of claim 1, wherein the interface comprises an object variable.

7. The system of claim 1, wherein each of the first phase and the second phase is selected from a list comprising prepare, commit and rollback.

8. A system, comprising a command object representing a command in a nested atomic transaction, the command object comprising:
 an interface constructed and arranged to pass to the command object an instruction to perform a first phase of a first of the managed nested atomic transactions; to pass a first completion status of the first phase of the first transaction; to pass an instruction to a a sub-command object to perform a second phase of a second one of the managed nested atomic transactions; and to pass a second completion status of the second phase of the second transaction from the sub-command object, wherein the interface enables the command object to receive a list of work units related to the second phase of the second transaction from the sub-command object.

9. The system of claim 8, wherein each of the first phase and the second phase is selected from a list comprising prepare, commit and rollback.

10. The system of claim 8, wherein the interface-comprises:
 a routine configured to count how many times the routine has been invoked and the instruction to perform the first phase of the first transaction includes the count of the number of times the routine has been invoked.

11. The system of claim 10, wherein the interface passes from the command object information regarding inserting additional work units related to the first phase of the first transaction into the list of work units; and to pass the list of work units.

12. A method of completing a command represented by a composite command object, the composite command object managing at least one sub-command object and for use in managing nested atomic transactions, the method comprising:
 instructing each of the sub-command objects to perform a prepare phase;
 receiving a list of work units from at least one of the sub-command objects, the work units being related to the prepare phase of the at least one of the sub-command objects;
 passing the list of work units to a manager of the composite command object; and
 instructing each of the sub-command objects to perform a second phase, wherein, if all the sub-command objects' prepare phases succeed, the second phase is a commit phase, otherwise the second phase is a rollback phase.

13. The method of claim 12, further comprising:
 inserting additional work units related to a prepare phase of the composite command object into the list of work units before passing the list of work units to the manager of the composite command object.

14. The method of claim 12, further comprising:
 receiving a second list of work units from at least one of the sub-command objects, the work units being related to the second phase of the at least one of the sub-command objects; and
 passing the second list of work units to the manager of the composite command object.

15. The method of claim 14, further comprising inserting additional work units related to the second phase of the composite command object into the second list of work units before passing the second list of work units to the manager of the composite command object.

16. An article of manufacture for use in managing nested atomic transactions, comprising:
 a computer-readable medium storing computer-executable instructions, the instructions implementing an interface between a transaction manager and a first transaction participant, comprising:
 an instruction passing mechanism configured to pass from the transaction manager to the first transaction participant an indication regarding a first phase of a first of the nested atomic transactions for performance by the first transaction participant, and to pass from the first transaction participant to a second transaction participant an indication regarding a second phase of a second of the nested atomic transactions for performance by the second transaction participant; and
 a status passing mechanism configured to enable pass from the first transaction participant an indication regarding a first completion status of the first phase of the first transaction, and to pass from the second transaction participant an indication that a second completion status of the second phase of the second transaction.

17. The article of manufacture of claim 16, wherein the interface further comprises:
 a parameter passing mechanism configured to pass from the second transaction participant a list of work units related to the second phase of the second transaction.

18. The article of manufacture of claim 17, wherein the parameter passing mechanism is further configured to pass from the first transaction participant information regarding inserting additional work units related to the first phase of the first transaction into the list of work units.

19. The article of manufacture of claim 18, wherein each of the first phase and the second phase is selected from a list comprising prepare, commit and rollback.

20. A computer readable medium storing instructions for execution by a computer for implementing an interface between a transaction manager and a first transaction participant for use in managing nested atomic transactions, the interface comprising:
 an instruction passing mechanism configured to pass from the transaction manager to the first transaction participant an instruction instructing the first transaction participant to perform first phase of a first of the nested atomic transactions, and further configured to pass from the first transaction participant to a second transaction participant an instruction instructing the second transaction participant to perform second phase of a second of the nested atomic transactions; and
 a status passing mechanism configured to pass from the first transaction participant an indication regarding a first completion status of the first phase of the first transaction, and to pass from the second transaction participant an indication regarding second completion status of the second phase of the second transaction.

21. The computer readable medium of claim 20, wherein each of the first phase and the second phase is selected from a list comprising prepare, commit and rollback.

22. The computer readable medium of claim 20, wherein the interface further comprises:
a parameter passing mechanism configured to pass from the second transaction participant a list of work units related to the second phase of the second transaction.

23. The computer readable medium of claim 22, wherein the parameter passing mechanism is further configured to pass from the first transaction participant information regarding inserting additional work units related to the first phase of the first transaction into the list of work units.

24. The computer readable medium of claim 23, wherein each of the first phase and the second phase is selected from a list comprising prepare, commit and rollback.

* * * * *

UNITED STATES PATENT AND TRADEMARK OFFICE
CERTIFICATE OF CORRECTION

| | | |
|---|---|---|
| PATENT NO. | : 7,236,967 B2 | Page 1 of 1 |
| APPLICATION NO. | : 10/161369 | |
| DATED | : June 26, 2007 | |
| INVENTOR(S) | : Dirk J. Hogan | |

It is certified that error appears in the above-identified patent and that said Letters Patent is hereby corrected as shown below:

In column 10, line 66, delete "$ERROR_{13}PLUS_{13}SUCCESSFUL_{13}ROLLBACK$" and insert -- ERROR_PLUS_SUCCESSFUL_ROLLBACK --, therefor.

In column 12, line 54, in Claim 1, delete "arranged to to pass" and insert -- arranged to pass --, therefor.

In column 12, line 58, in Claim 1, after "instruction" delete "to a a" and insert -- to a --, therefor.

In column 12, lines 66-67, in Claim 3, delete "interface-comprises" and insert -- interface comprises --, therefor.

In column 13, line 24, in Claim 8, afer "instruction" delete "to a a" and insert -- to a --, therefor.

In column 13, lines 36-37, in Claim 10, delete "interface-comprises" and insert -- interface comprises --, therefor.

In column 14, line 30, in Claim 16, after "configured to" delete "enable".

Signed and Sealed this

Twelfth Day of August, 2008

JON W. DUDAS
*Director of the United States Patent and Trademark Office*